(12) United States Patent
Petersson et al.

(10) Patent No.: US 8,906,238 B2
(45) Date of Patent: Dec. 9, 2014

(54) FLUID CLARIFIER AND METHOD FOR CLARIFYING A FLUID

(75) Inventors: Ninni Petersson, Göteborg (SE); Luc Antelme, Göteborg (SE)

(73) Assignee: Flocazur AB, Göteborg (SE)

( * ) Notice: Subject to any disclaimer, the term of this patent is extended or adjusted under 35 U.S.C. 154(b) by 0 days.

(21) Appl. No.: 13/991,156

(22) PCT Filed: Dec. 22, 2011

(86) PCT No.: PCT/SE2011/051584
§ 371 (c)(1),
(2), (4) Date: Aug. 27, 2013

(87) PCT Pub. No.: WO2012/087239
PCT Pub. Date: Jun. 28, 2012

(65) Prior Publication Data
US 2013/0327717 A1    Dec. 12, 2013

(30) Foreign Application Priority Data

Dec. 22, 2010 (SE) .................................. 1051368

(51) Int. Cl.
| | | |
|---|---|---|
| C02F 1/24 | (2006.01) | |
| B03D 1/00 | (2006.01) | |
| C02F 1/52 | (2006.01) | |
| B03D 1/14 | (2006.01) | |
| A23L 2/70 | (2006.01) | |
| C12C 7/24 | (2006.01) | |
| B03D 1/24 | (2006.01) | |
| A01J 11/10 | (2006.01) | |
| B03D 1/26 | (2006.01) | |
| C12H 1/16 | (2006.01) | |
| C12G 1/02 | (2006.01) | |

(52) U.S. Cl.
CPC .................. *C02F 1/24* (2013.01); *C02F 1/5209* (2013.01); *C02F 2301/024* (2013.01); *B03D 1/1412* (2013.01); *C02F 2209/40* (2013.01); *B03D 1/1462* (2013.01); *A23L 2/70* (2013.01); *C12C 7/24* (2013.01); *B03D 1/1493* (2013.01); *B03D 1/242* (2013.01); *A01J 11/10* (2013.01); *C02F 2301/028* (2013.01); *B03D 1/26* (2013.01); *C12H 1/16* (2013.01); *C02F 1/5281* (2013.01); *C12G 1/02* (2013.01)
USPC ........ 210/703; 210/767; 210/776; 210/532.1; 210/537

(58) Field of Classification Search
CPC ......... A01B 12/006; C12C 7/24; A01J 11/10; C02F 2301/024; C02F 2209/40; A23L 2/70; B03D 1/242; B03D 1/1462; B03D 1/1493; B03D 1/26; B03D 1/29; C12H 1/16; C12G 1/02

USPC .............. 210/767, 776, 703, 531.1, 537, 800, 210/521, 522.1, 534, 522

See application file for complete search history.

(56) References Cited

U.S. PATENT DOCUMENTS

| | | | | |
|---|---|---|---|---|
| 2,647,869 | A * | 8/1953 | Kelly ............................. | 210/530 |
| 4,919,812 | A * | 4/1990 | Lasson ......................... | 210/519 |
| 5,158,678 | A * | 10/1992 | Broussard, Sr. ............ | 210/221.1 |
| 6,197,190 | B1 | 3/2001 | Hanlon | |
| 6,719,911 | B2 * | 4/2004 | Bourke ......................... | 210/704 |
| 6,821,415 | B2 * | 11/2004 | Sharb ............................ | 210/122 |
| 7,485,223 | B2 * | 2/2009 | Eijt et al. .................... | 210/221.2 |

FOREIGN PATENT DOCUMENTS

| | | |
|---|---|---|
| DE | 3031755 A1 | 3/1981 |
| DE | 19953961 A1 | 5/2001 |
| GB | 2066232 A | 7/1981 |
| JP | 11300381 A | 11/1999 |
| JP | 2006281157 A | 10/2006 |
| WO | 2008/137006 A1 | 11/2008 |

OTHER PUBLICATIONS

International Search Report mailed Mar. 29, 2012 for PCT/SE2011/051584 filed Dec. 22, 2011, 5 pages.
Extended European Search Report (includes Supplementary European Search Report and Search Opinion) received for European Patent Application No. 11851895.0, mailed on Jun. 27, 2014, 8 pages.

* cited by examiner

*Primary Examiner* — Nam Nguyen
*Assistant Examiner* — Claire Norris
(74) *Attorney, Agent, or Firm* — Morrison & Foerster LLP

(57) ABSTRACT

Liquid clarifier and method for clarifying liquid, comprising a liquid reactor which comprises an cylindrical tank having an upper vertical section and a lower tapered section, an inner cylinder extending along at least part of the upper section of the tank and an outlet for clarified liquid at the top of the tank, where the liquid clarifier further comprises a gas compressor adapted to inject compressed gas into the lower region of the cylinder and an inlet for an unclear liquid at the upper region of the cylinder, and at least one partition wall inside the cylinder, where the at least one partition wall create flow channels in the lower region of the inner chamber, where the compressed gas is adapted to be injected through gas inlets in flow channel/s in order to create an upward flow in the flow channel/s having gas inlets, which will create a downward flow in the flow channel/s without gas inlets, where the at least one partition wall extends out of the lower region of the cylinder. The advantage of the invention is that different kinds of liquids can be clarified in an efficient and fast way without the need of specific additives.

14 Claims, 4 Drawing Sheets

FLUID CLARIFIER AND METHOD FOR CLARIFYING A FLUID

CROSS REFERENCE TO RELATED APPLICATIONS

This application is a U.S. National Phase patent application of PCT/SE2011/051584, filed on Dec. 22, 2011, which claims priority to Swedish Patent Application No. 1051368-7, filed on December 2010, each of which is hereby incorporated by reference in the present disclosure in its entirety.

TECHNICAL FIELD

The present invention relates to an arrangement and a method for clarifying fluids. The inventive arrangement and method is suitable for treating different fluids, such as polluted fresh water, polluted salt water and other fluids.

BACKGROUND ART

There are several different techniques known to treat unclean water containing different pollutions. Depending on the type of pollutant, one or more techniques may be used either alone or in combination. When treating unclean water comprising particles suspended in the water, e.g. in a sewage system, the system may comprises different mechanical filter types, one or more biological processing steps and one or more chemical processing steps.

In a sewage system, contaminants are removed from wastewater and household sewage, both effluents and domestic. It includes physical, chemical, and biological processes to remove physical, chemical and biological contaminants. The main purpose is to produce an environmentally-safe fluid waste stream with more or less clean water that can be discharged in nature, e.g. in a river, see or lake, and a solid waste in the form of sludge that can be disposed of or reused.

The waste water of the sewage system may be more or less clean. When undesirable chemicals, materials, and biological contaminants have been removed from contaminated water, the water is defined as purified and can be used for a specific purpose, e.g. as drinking water or other purposes, including meeting the requirements of medical, pharmacology, chemical and industrial applications. In general the methods used to purify water includes physical processes such as filtration and sedimentation, biological processes such as slow sand filters or active sludge and chemical processes such as flocculation and chlorination.

Flocculation is a process which clarifies the water by removing any turbidity, i.e. suspended particles or colloid, or colour so that the water is clear and colourless. Flocculation removes the suspended particles by causing a precipitate to form in the water. By stirring the water, the particles will stick together to form bigger particles by adsorbing onto the surface of small precipitate particles which then grows into larger particles as a coagulation product which can easily be removed. In the flocculation process, a coagulant or flocculation agent may be used to aid the flocculation process. Such coagulants comprise iron, aluminum or synthetic polymers.

Traditional flocculation processes are known under such names as Pulsator, Super Pulsator, Cyclofloc, Cirkulator, Fluorapid and Accelator. All these flocculation processes need different mechanical parts and are designed as large nonflexible structures. They further require a high maintenance to function properly.

U.S. 20070114184 discloses a method and apparatus for treating wastewater. The apparatus comprises a reactor having a centrally arranged flow channel. An agitator in the form of a propeller is disposed within the flow channel which creates a downward flow of water or wastewater through the flow channel. A reagent is injected into the water or wastewater and the agitator within the flow channel serves to mix the reagent with the water or wastewater passing there through.

U.S. 20040011745 discloses a combined degassing and flotation tank for separation of a water influent containing considerable amounts of oil and gas. A rotational flow is created in the tank which forces the lighter components such as oil and gas droplets towards an inner concentric cylindrical wall where they coalesce and rise to the surface of the liquid whereas the heavy particles sink to the lower part where they may be removed as sludge. The water is discharged via an outlet in the lower part of the tank. The combined degassing and flotation tank is particular suited for use in oil production at sea for removal of oil.

U.S. 20050115881 discloses a water purification installation having a coagulation area, a flocculation area, an area for mixing the flocculated water with pressurized water delivered by micro bubbles, and a flotation area. Suspended matter, which is brought to the surface by the micro bubbles, is evacuated from the upper part of the flotation area. The lower part of the flotation area includes means of collecting the clarified water.

WO 05063630 A discloses a method for treating waste water, e.g. municipal waste water including sewage, which comprises adding a particulate material to the waste water, and then performing a flotation process so that the particulate material rises to the surface of the waste water, entraining solids material in the waste water. The particles may comprise bubbles of soda lime borosilicate glass.

CN 1312226 A discloses a method and arrangement for counter flow water treatment, where micro bubbles flow counter to downward flowing raw water, where flocculate can contact with upward flowing bubbles such that the bubbles may cohere with flocculate to produce a suspension sludge layer, which can provide contact flocculation and sludge filtration action on raw water.

CN 1397503 A discloses a process for cleaning water including mixing the flocculants with the water to be treated in a water inlet pump, where the reaction between air bubbles and flocculants is obtained in a counter current flow, where the resultant water is discharged from the bottom of the reactor, and the waste is discharged from the top of the reactor.

DE 3031755 A1 discloses a water cleaning process using an inner chamber in which the water is circulated and where floatation takes place. Chemicals are used to flocculate the particles in the water.

JP 11300381 A discloses a water cleaning process in which flocculation and decanting is used to treat the water.

These and similar known processes and systems may work well in specific cases. There is however still room for improvements.

DISCLOSURE OF INVENTION

An object of the invention is therefore to provide an improved arrangement for clarifying a liquid. A further object of the invention is to provide an improved method for clarifying a liquid.

The solution to the problem according to the invention is described in the characterizing part of claim 1. An inventive method for clarifying liquid is described in claim 11. The other claims contain advantageous further developments of the inventive arrangement and method.

In a liquid clarifier for treating a liquid, comprising a liquid reactor which comprises an essentially cylindrical vertical tank having an upper section with substantially vertical walls and a lower tapered section, an inner cylinder extending along at least part of the upper section of the tank and an outlet for clarified liquid at the top of the tank, where the water clarifier further comprises a gas source adapted to inject compressed gas into the lower region of the cylinder and an inlet for unclear liquid at the upper region of the cylinder, the object of the invention is achieved in that the liquid reactor further comprises at least one partition wall inside the lower region of the cylinder, where the at least one partition wall create flow channels in the lower region of the inner chamber, where the compressed gas is adapted to be injected through gas inlets in flow channel/s in order to create an upward flow in the flow channel/s having gas inlets, which will create a downward flow in the flow channel/s without gas inlets, where the at least one partition wall extends out of the lower region of the cylinder.

By this first embodiment of the liquid clarifier according to the invention, a liquid clarifier with improved liquid clarifying properties is obtained. The liquid clarifier can be adapted for different types of liquids, both for liquids having a high degree of particles as well as for liquids having a low concentration of particles. The liquid clarifier can be adapted for unclear liquids such as fresh water, salt water and for other types of liquids that needs to be clarified.

In an advantageous development of the inventive liquid clarifier, the liquid reactor is further provided with an outlet for low density particles at the top of the cylinder. In this way, also particles having a low density can be removed as flotation residue by the liquid clarifier.

In an advantageous development of the inventive liquid clarifier, the at least one partition wall is formed by one or more cylindrical tubes. The one or more cylindrical tubes may be mounted in a grid in the cylinder, where the opening area of the grid may be set to a predefined value. In this way, the flow through the tubes may be controlled to a higher degree.

In an advantageous development of the inventive liquid clarifier, the at least one partition wall is formed by one or more plates inside the cylinder. The at least one partition wall can be displaced in a vertical direction, parallel to the wall of the cylinder. In this way, the liquid clarifier can be tuned to the properties of the actual liquid. Variations in the liquid can thus be handled in an efficient and easy way.

In an advantageous development of the inventive liquid clarifier, the liquid clarifier comprises a feedback conduit that is adapted to forward part of the discharged high density sludge to the liquid inlet. In this way, the clarification efficiency may be further improved.

In an inventive method for clarifying a liquid, the steps of inserting an unclear liquid to a inner chamber of a vertical cylindrical tank having a tapered lower section, injecting compressed gas into the lower region of the inner chamber, where the inner chamber is provided with at least one partition wall that extends out of the lower region of the inner chamber, such that the liquid is circulated through the flow channels, where the at least one partition wall creates a compression zone for the liquid, and where the liquid is decompressed above the at least one partition wall, such that the particles in the liquid are forced to bond to each other and/or to gas bubbles, and where the clarified liquid is discharged out of the upper part of the tank, outside of the inner chamber are disclosed.

By the inventive method, a simple, cost-effective and efficient liquid clarification method is obtained, in which no mechanical moving parts are required. Further, no additional chemical additives are needed for the clarifying process.

BRIEF DESCRIPTION OF DRAWINGS

The invention will be described in greater detail in the following, with reference to the attached drawings, in which.

MODES FOR CARRYING OUT THE INVENTION

The embodiments of the invention with further developments described in the following are to be regarded only as examples and are in no way to limit the scope of the protection provided by the patent claims. The clarification of a liquid is defined as removing suspended particles or colloids from the liquid which are merely suspended in the liquid. The result is a clear liquid.

Figure 1:
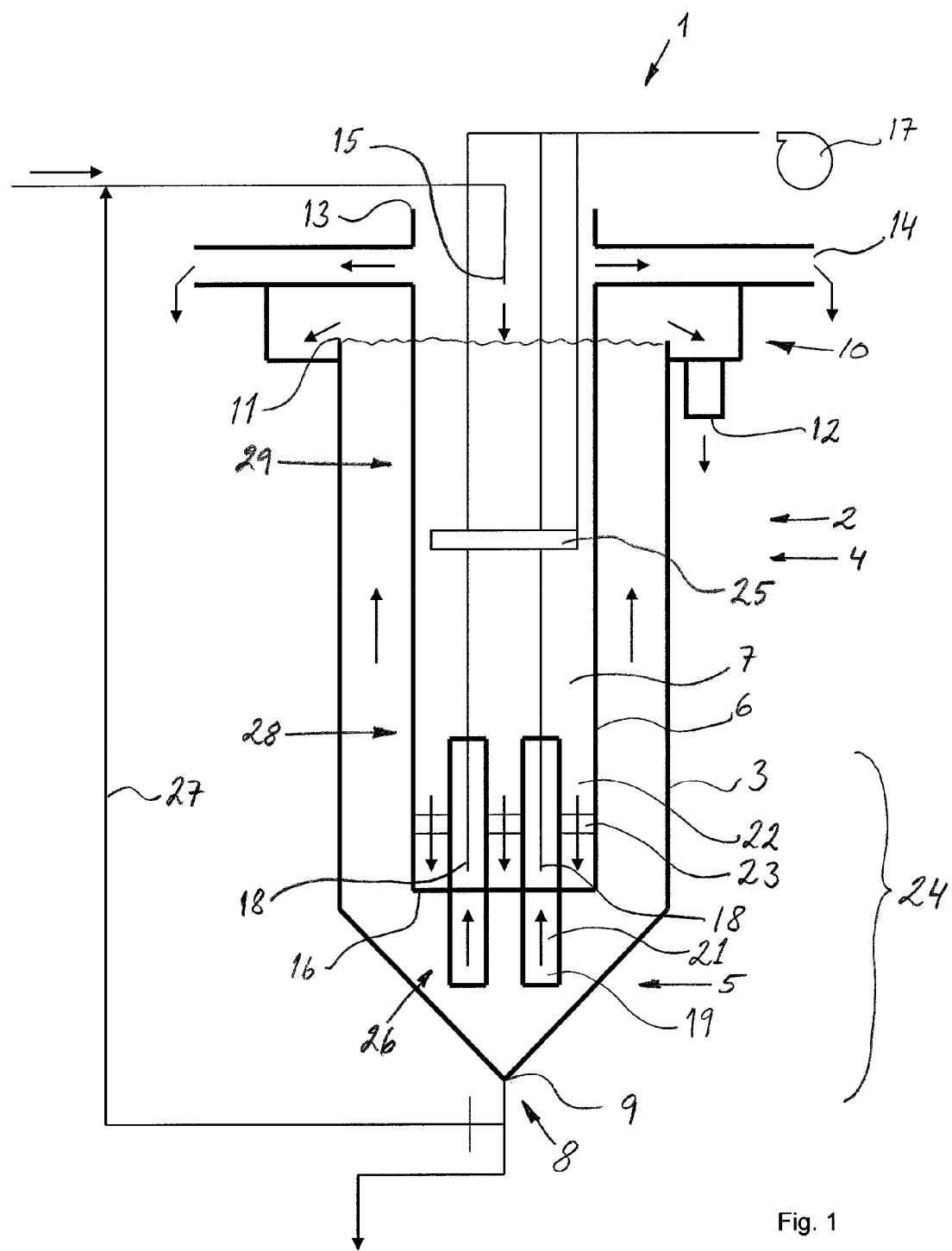
FIG. 1 shows a cut view through a liquid clarifier according to a first embodiment of the invention.

FIG. 1 shows a cut view through a first embodiment of a liquid clarifier 1 according to the invention. The liquid clarifier is adapted to clarify an unclear liquid without the need of, or by using only a small amount of, additional additives such as a coagulant or a flocculation agent. The liquid may be e.g. contaminated fresh water or salt water. The water may come from different sources and may include e.g. industrial, agricultural or sewer waste water. The water may be raw water, leachate water from waste disposal sites, waste water from fish breeding both in fresh water and salt water, or other process water.

The liquid may also be other types of water based liquids, such as beverages containing particles or colloids. Examples are wine, beer, juice, dairy products, distillates, or other fermented liquids. The liquid may also be a non-water based liquid such as a solvent, a cutting fluid or an oil. The inventive liquid clarifier may be adapted to the specific liquid source and also to specific requirements regarding clarifying capacity and particle sizes.

The liquid clarifier 1 comprises a liquid reactor 2 for receiving the unclear liquid, for treating and clarifying the liquid and for discharging clarified liquid and separated waste. The liquid reactor comprises a substantially cylindrical liquid tank 3 that is positioned in a vertical manner, i.e. the centre axis is vertical when the liquid clarifier is in use. The tank 3 comprises an upper section 4 having a vertical wall and a tapered or conical lower section 5 that ends in an apex 8. The liquid tank is provided with an outlet 9 at or close to the apex for discharging waste in the form of sludge. The apex angle of the cone is preferable in the range between 60 to 150 degrees. The height of the tapered lower section 5 is preferably less than half of the total height of the tank 3. The height of the tank depends on the intended use and may be as small as less than 1 meter for a small-scale liquid clarifier and may be up to 10 meters and more for large scale devices. The height of the tank is preferably at least twice the diameter of the tank. The diameter may thus be in the range between less than 0.5 meter up to 5 meters and more. Even though the size of a liquid clarifier may be scaled up to a large extent, it is preferred to use several medium sized liquid clarifiers connected in series and/or parallel in order to increase the capacity of the liquid clarifier system.

When several liquid clarifiers are used in a system, it is also possible to use liquid clarifiers with different properties in the same system. It is e.g. possible to use liquid clarifiers adapted for different specific liquid qualities and/or adapted for liquids containing different particles sizes. In such a system, it would be possible to have a first liquid clarifier adapted to sort out large particles and a subsequent liquid clarifier adapted for smaller particles. When connected in parallel, it is possible to use only one liquid clarifier when the supply of unclear liquid is low and to use several in parallel when the unclear liquid supply is large. This can be done without affecting the efficiency of the liquid clarifiers and without specific start up procedures. Such a system is thus well suited for varying amounts of liquid.

The liquid tank 3 is provided with an outlet section 10 extending around the upper edge 11 of the liquid tank. The outlet section comprises a ring shaped collecting trough that will collect the overflow of clarified liquid that flows over the upper edge 11 of the liquid tank. The collected and clarified liquid is discharged through an outlet opening 12.

The liquid clarifier further comprises an inner cylinder 6 forming an inner chamber 7 in the liquid reactor. The diameter of the inner cylinder is preferably less than half of the diameter of tank 3, but may be in the range of 20% to 70% of the diameter of the tank, depending on the intended use. The inner cylinder is positioned in a vertical position in the tank and is positioned in a centralized manner around the centre axis of the tank, such that the wall of the cylinder is parallel to the vertical wall of the liquid tank 3. The cylinder extends along at least part of the upper section of the liquid tank, and the lower edge 16 of the cylinder may extend into the tapered section of the liquid tank. The upper edge 13 of the cylinder extends above the upper edge 11 of the tank. At the upper region 28 of the cylinder, close to the upper edge 13 and above the upper edge 11 of the tank, one or more outlet openings 14 are provided, which are adapted to drain of low density particles that are flocculated and that floats up from the liquid mixture in the inner chamber. The low density particles will be arranged in the form of a foam or a foam like compound.

Unclear liquid is introduced into the inner chamber from an inlet opening 15 that is preferably positioned above the liquid level of the inner chamber, i.e. above the upper edge 11 of the tank 3. It is important that the unclear liquid is introduced in the upper region of the inner chamber, and preferably above the liquid level. In this way, the introduced unclear liquid is mixed with the liquid mixture in the inner chamber in an efficient way. It is possible to introduce unclear liquid in the upper region of the inner chamber, under the liquid level, even though the introduced unclear liquid will not mix as well with the liquid mixture. The infeed flow of unclear liquid is adapted to the clarifying capacity of the liquid clarifier.

In order to clarify the introduced unclear liquid in a reliable way, the cylinder is provided with one or more partition walls 26. The partition wall or walls create flow channels 21, 22 in the lower region of the inner chamber. The partition wall or walls are positioned in the lower region 28 of the cylinder and may extend up to the upper region 29 of the cylinder. The lower part of the partition wall or walls extends out of the cylinder, below the lower edge 16 of the cylinder. It is important that the partition wall or walls extends out of the cylinder in order to be able to create the desired flow through the flow channels in the inner chamber. The part of the partition wall or walls that extends out of the cylinder is preferably at least 5% of the total height of the partition wall or walls and may be up to more than 50% of the total height of the partition wall or walls, depending on the height of the liquid tank and the height of the cylinder. The partition wall or walls preferably extend into the tapered lower section 5 of the tank.

Figure 2:
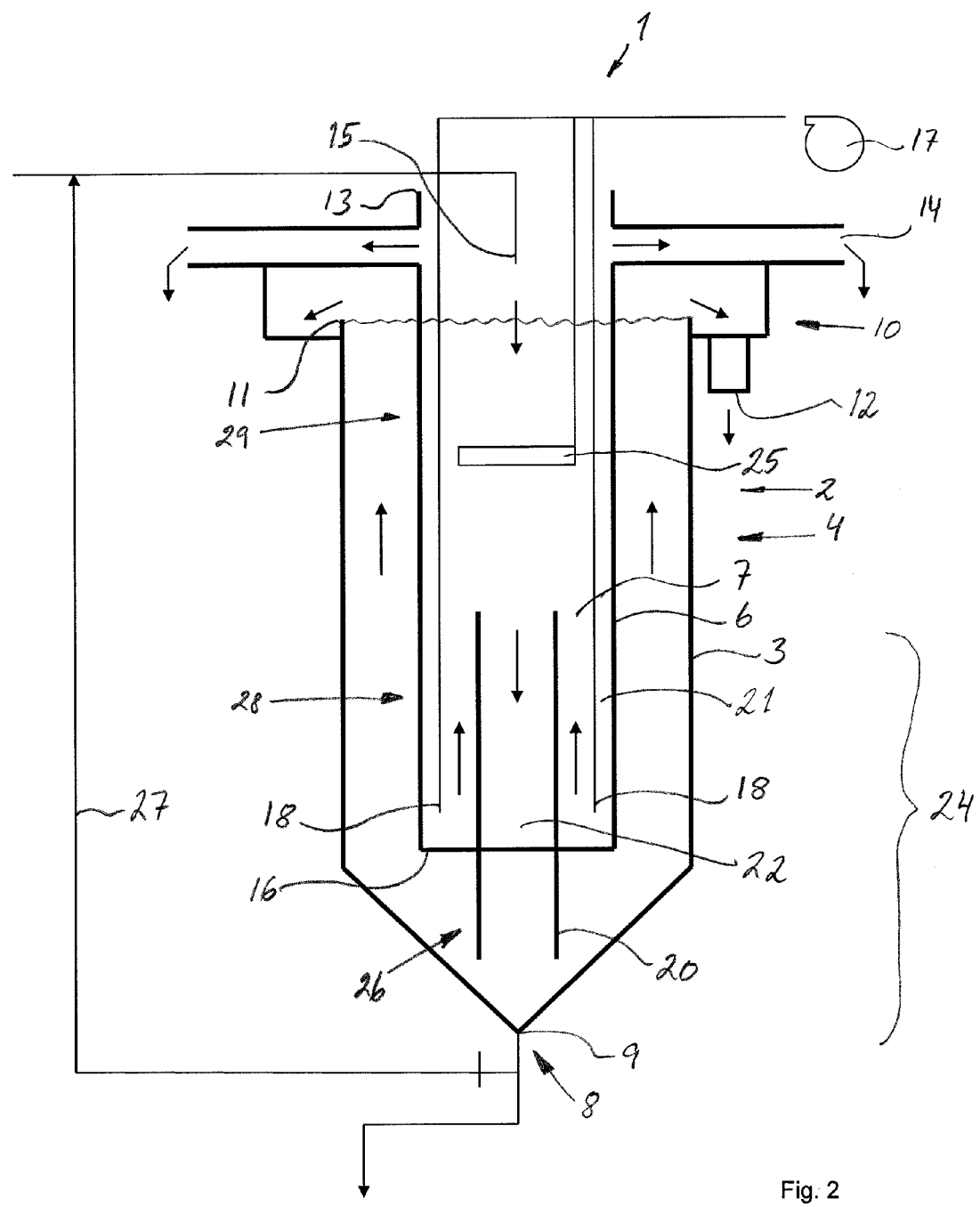
FIG. 2 shows a cut view through a second embodiment of a liquid clarifier according to the invention.

The partition wall or walls create flow channels in the inner chamber. The flow in the flow channels is created by a gas source 17 that injects compressed gas into some of the flow channels through gas inlets 18. FIG. 1 shows a first exemplified embodiment where the partition walls are formed by a plurality of tubes 19. FIG. 2 shows a second exemplified embodiment where the partition walls are formed by several plates 20. The plates are preferably flat but may also have a curved shape. The flow in the flow channels will either be an upward flow or a downward flow. The gas bubbles rising up towards the liquid level will supply energy to the particles to adhere to other particles and to charge the particles. The energy is proportional to the height of the cylinder 6.

The gas source may be an air compressor adapted to inject compressed air into the liquid. The gas source may also be a compressed gas tank comprising the required gas in a compressed state, where the gas is injected into the liquid through a pressure reducer. Most often, the gas used will be air supplied by an air compressor, but there are some uses where other gases are of advantage. In some processes, there may be a need to use a gas that does not react with the liquid, e.g. an inert gas such as nitrogen. It may also be a need to use a gas that does react with the liquid, such as carbon dioxide which can be used to control the pH-value of the liquid.

In FIG. 1, the partition walls 26 are formed by four tubes 19. The tubes are positioned in a symmetric way in the inner chamber. Other numbers of tubes are of course also possible to use, depending e.g. on the type of liquid that is to be clarified and the diameter of the cylinder. It is possible to use only one tube or to use more than ten tubes. It is preferred that the cross section area of the tubes is in the same order of magnitude as the cross section area of the remaining part of the inner chamber. In the shown example, one gas inlet 18 is positioned in each tube 19. When compressed gas is injected through the gas inlets, an upward flow is created in the tubes, thus creating flow channels through the tubes. The upward flow through the tubes will in turn create a downward flow in the flow channel between the tubes, caused by the suction from the upward flow in the tubes and by the pressure from the excessive liquid volume above the tubes in the inner chamber. The liquid mixture will thus circulate through the flow channels.

In the shown example, flow channels 21 having an upward flow are created through the tubes 19 and a flow channel 22 having a downward flow is created between the tubes in the inner chamber. It is also possible to inject the gas between the tubes, i.e. to let flow channel 22 have an upward flow and to let the flow channels 21 through the tubes 19 have a downward flow. It is however easier to control the circulation of the liquid mixture by injecting the gas into the tubes. Another advantage of injecting the gas into the tubes is that each injection nozzle can be controlled separately. In this way, it is possible to control the capacity of the liquid reactor by shutting of one or more gas nozzles, e.g. when the capacity is to be reduced due to a lower infeed liquid volume.

The capacity of the liquid reactor is partly set by the geometry and the size of the liquid reactor. One way of controlling the flow rate through the flow channels is to mount a grid 23 between the tubes in the flow channel 22.

The throughput of the grid, i.e. the area of the grid openings, is chosen such that a required flow rate is obtained.

In FIG. 2, the partition walls 26 are formed by two plates 20. The plates are positioned in a symmetric way in the inner chamber, such that the cross section area of the two side flow channels created between the plates and the cylinder wall is in the same magnitude as the cross section of the central flow channel between the plates. Other numbers of plates are of course also possible to use, depending e.g. on the type of liquid that is to be purified and the diameter of the cylinder. It is possible to use only one plate or to use several plates. In the shown example, one gas inlet 18 is positioned in each side flow channel 21 created between the plates and the wall of the cylinder. When compressed gas is injected through the gas inlets, an upward flow is created in the side flow channels. The upward flow will in turn create a downward flow in the centre flow channel between the plates, caused by the suction from the upward flow in the side flow channels and by the pressure from the excessive liquid volume above the plates in the inner chamber. The liquid mixture will thus circulate through the flow channels.

In the shown example, upward side flow channels 21 are created between the plates 20 and the wall of the cylinder and a centre downward flow channel 22 is created between the plates in the inner chamber. It is also possible to inject the gas in the central flow channel, between the plates, i.e. to let centre flow channel 22 have an upward flow and to let the side flow channels 21 have a downward flow. One advantage of injecting the gas into several flow channels is that each injection nozzle can be controlled separately. In this way, it is possible to control the capacity of the liquid reactor by shutting of one or more gas nozzles, e.g. when the capacity is to be reduced due to a lower infeed liquid volume.

During the circulation, the liquid mixture will be exposed to a hyper dynamic circulation due to the compression—decompression of the liquid mixture when passing the flow channels. During this circulation of the liquid mixture, the particles in the liquid mixture will collide with other particles and will adhere to each other, creating larger aggregated particles. This actively created circulation creates a turbulent flow with a relatively high flow rate which in turn gives each particle a high probability to collide with another particle. The turbulent flow creates a three dimensional flow increasing the probability for a particle to collide.

The turbulent flow caused by the gas injection and the flow channels will at the same time increase the surface charge of the particles, which will also increase the likelihood for particles to adhere to each other. The surface charge of a particle will increase with each circulation through the flow channels. These two effects will thus allow the particles to adhere to each other, i.e. to flocculate, in an efficient way. Due to the double adhering effect, there is no need to add a coagulant or flocculation agent to the liquid mixture in order to flocculate the particles. This is both an economical and an environmental advantage, since such agents are both costly and may be hazardous for the environment. Some agents must also be removed in a subsequent process. In some cases, it may be necessary to add a small amount of additive in order to start the flocculation process when the liquid clarifier is started up. When the liquid purifier is running, the active sludge mix will be sufficient for the required liquid clarification.

The liquid mixture will compress when passing the flow channels and will decompress in the inner chamber above the tubes and in the lower section of the tank, below the tubes or plates. The liquid mixture comprises liquid mixed with larger, aggregated particles, i.e. sludge. The sludge in the liquid mixture may be sludge having a relatively low density such that it flows with the liquid mixture, but may also be high density sludge that is reintroduced into the liquid mixture through a feedback conduit 27. The flocculated particles having a higher density will sink to the lower part of the tank, where they will constitute an active sludge mix through which the liquid mixture passes. Small, separate particles may adhere to the aggregated particles in the active sludge mix, as well as larger, aggregated particles. In the shown example, the active sludge mix region is indicated by 24.

The active sludge mix region 24 may vary in height depending on the amount of inserted liquid and the amount of contaminant in the liquid. It is preferred to let the upper border of the active sludge mix region be at the same height as the upper part of the partition wall or walls and to fluctuate around this height. If the active sludge mix region rises above this height, some decanted sludge may be discharged by the outlet 9 in order to control the height of the active sludge mix. If the active sludge mix region sinks below this height, more unclear liquid may be introduced. It is of course preferred that the dimensions of the liquid clarifier are adapted to the foreseen liquid flow such that the height of the active sludge mix region 24 can be held on the optimum height. Above the active sludge mix region 24 in the liquid tank 3, outside of cylinder 6, the liquid is clear.

During circulation, most particles will adhere to another particle. The particles that have not adhered to another particle during circulation will adhere to the particles in the active sludge mix which will act as the final step of the flocculation. Clarified liquid will slowly rise in the tank, through the active sludge mix region outside of the inner chamber and will be collected by the outlet section 10 of the tank and further discharged through outlet opening 12. The area between the lower edge 16 of the cylinder and the inner wall of the tank 3 will also constitute a compression area for the active sludge mix, such that the sludge mix will concentrate some in this area. This will also help in clarifying the liquid. The output of clarified liquid is controlled by the amount of unclear liquid that is introduced to the inner chamber.

In order to improve the clarification of certain liquids comprising a relatively high degree of low density particles, where a large degree of the liquid clarification is effected by floatation, a further gas injector 25 adapted to inject micro bubbles is positioned in the inner chamber, above the tubes or plates. The micro bubbles are created by a micro bubble nozzle of the gas injector 25 connected to a gas source, either the same gas source used for the gas injection in the flow channels or a separate gas source. It is possible to use different types of gases for the gas inlets 18 and the gas injector 25. The micro bubble nozzle may be combined with a separate liquid tank for the creation of micro bubbles. The micro bubbles will create a higher degree of floatation of hydrophobic and low density particles that will be discarded through the outlet openings 14 in the upper section of the cylinder.

In a development of the described examples, the partition wall or walls can be displaced in the vertical direction. This is possible both for partition tubes and partition plates. By displacing the partition walls vertically, the liquid reactor can be adapted for different types of liquids, comprising more or less particles of specific sizes. This can e.g. be of advantage for certain industries handling different types of products that outputs different types of contaminated liquids. By displacing the partition wall or walls in a vertical direction, the height of the active sludge mix region can be adjusted to a required level.

In the present invention, where a hyper dynamic circulation and recirculation is created, several processes are involved in the clarification of a liquid at the same time. Flocculation, oxidation, flotation, filtration and thickening of sludge will cooperate in the liquid reactor at the same time, which will provide for a very effective liquid clarification process. Because of the different processes involved, the efficiency of the clarification process will be higher than known processes.

The liquid reactor further functions without internal pumps or propellers which will lower the maintenance costs. The inventive liquid clarifier is flexible for different liquid qualities through a big diversity of specific internal options that could be hydraulic regulated. The inventive liquid clarifier can be connected in series or parallel for obtaining the most effective liquid clarification.

In this process, compression and decompression optimizes the particles natural bonding capacity and this is further enhanced through the three-dimensional space that the different chambers constitute. The particles inherent bonding capacity is maximized and accumulated through the high energy that is created in the process, which maximizes the ability of the particles to collide and bond to other particles from all directions at the same time. The charging of the particles, through increased friction between the particles, results in that even the finest particles increase theirs bonding capacity, resulting in a very effective flocculating, clarification and finally a sedimentation process. All these processes take place simultaneously in the liquid reactor. The active sludge mix that is created through the process is discharged, and a part of the sludge mix can be reintroduced to the system. The clarified liquid is discharged through a liquid outlet.

In one example, the inventive liquid clarifier is used in beer production. Beer production is a lengthy process with many included steps. By using the inventive liquid clarifier, the process can be improved by shortening the process, take away the need for minerals or chemicals and make the residues usable for e.g. bio-fuel.

The beer process is as follows; malt and hot water is mixed into a mash, this is called mashing. After this the grains are removed. The wort that remains is boiled. At the end of the boiling the wort is set into a whirpool, in order to remove coagulated proteins and other unwanted solids. This step can be replaced with an inventive liquid clarifier, where the coagulated proteins and other unwanted solids can be removed in a more energy efficient way. After this step the wort is cooled before yeast is added for fermentation in large tanks. When the beer is fermented, the yeast must settle at the bottom before the beer can be filtered. The settling of the yeast takes several days/weeks or up to months. For special lager, the yeast should remain but for the majority of beers (including regular lager beer), the breweries just want to get rid of the yeast. The inventive liquid clarifier can speed up the process of yeast settling without harming the quality of the beer, and at the same time, it could also replace the filtration that is needed before bottling the beer. In this way, there will be no need for complicated machines, filter sheets that clogs, kieselguhr or other minerals/chemicals that otherwise is necessary in the most commonly used method today. Further, the inventive liquid clarifier can also decrease the water usage throughout the production process.

In another example, the inventive liquid clarifier is used in the process of wine making, which partly resembles the one for beer. At first, the grapes are crushed in a large tank and this is where the primary fermentation occurs. During the fermentation, a wine must is created where all parts of the grapes are left. For white and rosé wine the grape residues are removed almost instantly. Today, the wine producers let them sediment, which is very time consuming and in some cases they also have to press the wine must to get all the juice from the grapes. The inventive liquid clarifier can be used to remove the grape shells, seeds and all other residues in a very gentle way. A further advantage of using the inventive liquid clarifier at this stage is that the primary fermentation can be controlled which otherwise can be very hard and cause big problems for winemakers, forcing them to use unnatural additives and synthetic yeasts instead of the natural occurring yeasts.

The next step in winemaking is to age the wine for 3 to 6 months, where the secondary fermentation occurs, which is a much slower process then the primary. After this stage, it is time for blending and lab test the wine in order to get the wanted flavors. Before bottling, the wine needs to be filtered in order to clarify it. This clarification is also well suited for the inventive liquid clarifier, providing an easy and environmentally friendly way of removing unwanted particles from the wine before bottling.

In a further example, the inventive liquid clarifier can be used within the dairy production. In one application, the cream is separated from the milk, creating cream and skim milk. Today, this process is usually done by, energy, water and maintenance demanding centrifuges. The inventive liquid clarifier can replace these machines and perform the same separation whit less energy and water at the same time as the maintenance need will be lowered, which increases the uptime for the manufacturer.

In another application, the lactose is separated from milk. Today, this is a costly and energy demanding process and there are few available solutions that can do it. Using the inventive liquid clarifier, this can be done in an energy- and cost-effective way compared to existing technologies.

In a development of the inventive liquid purifier, the liquid purifier is adapted mainly for unclear salt water and similar liquids. For unclear salt water, the most effective removal of particles takes place through flotation or protein skimming. There are several reasons for this. One reason is the low concentration of particles in conventional unclear salt water, which lowers the possibility for the particles to flocculate. Another reason is the absence of electric charging of the particles, which also reduces the adherence between particles. A further reason is also the higher density of salt water compared with fresh water. The higher density will cause more particles to float, further preventing flocculation and the creation of an active sludge mix. In this high-energy process with circulation and recirculation, i.e. compression and decompression, the low concentration of particles is concentrated by adhering to air bubbles which floats to the salt water surface with the particles.

Figure 3:
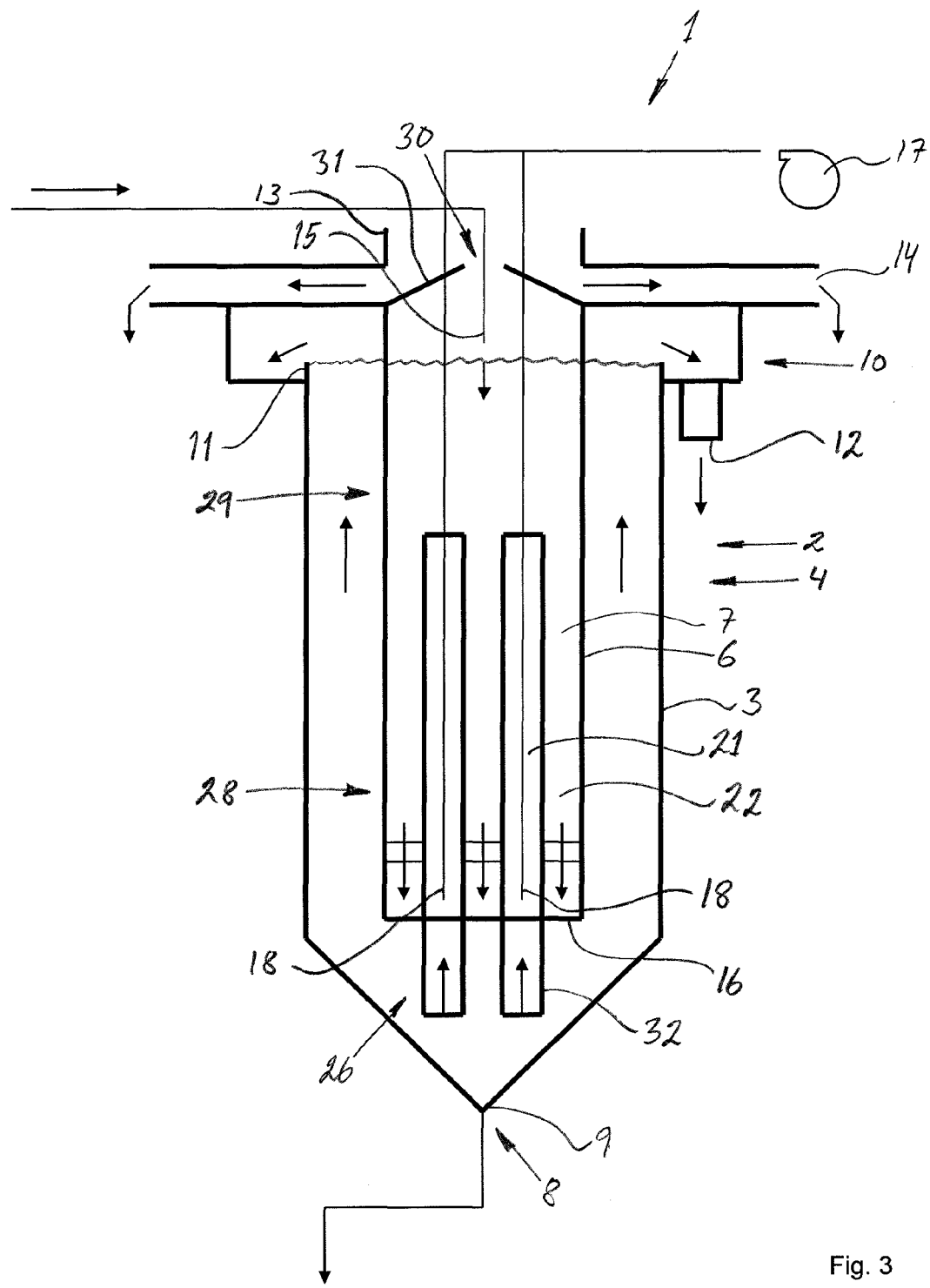
FIG. 3 shows a cut view through a further development of a liquid clarifier according to the invention.
Figure 4:
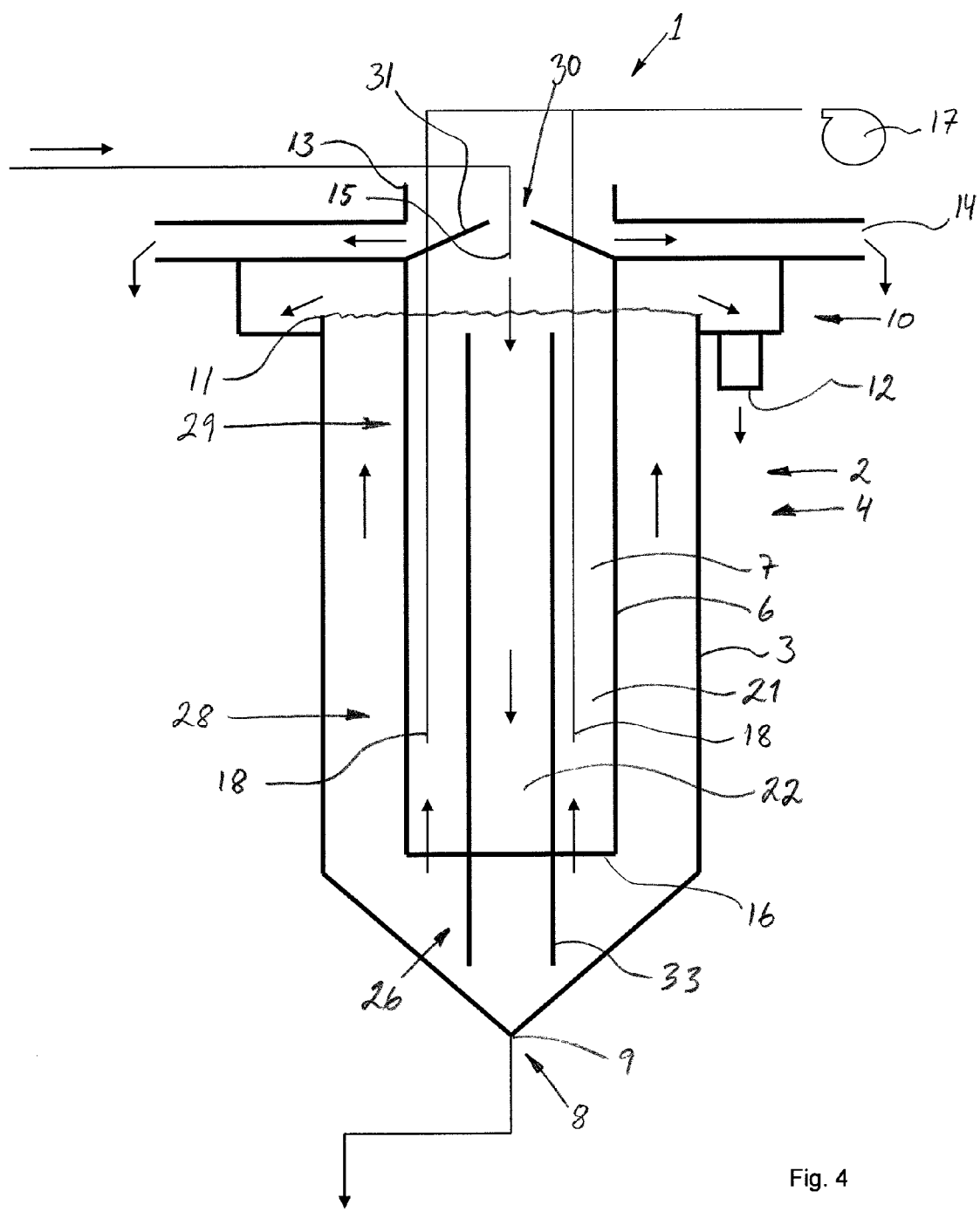
FIG. 4 shows a cut view through a further development of a liquid clarifier according to the invention.

In one development of the inventive unclear purifier adapted for unclear salt water, shown in FIG. 3, four tubes 32 constitute the partition walls 26. In another development of the inventive liquid purifier, shown in FIG. 4, two plates 33 constitute the partition walls 15. These liquid clarifiers resemble the liquid clarifiers as shown in FIG. 1 and FIG. 2, with the addition of a residual outlet 30 comprised in a funnel-shaped restriction cover 31 connected to the outlet openings 14. The restriction cover will provide a slight back pressure for the foamed residual such that the volume of the residual is decreased somewhat. Since these developments will rely mainly on flotation, there is no need to control the height of an active sludge mix region since there will not form any sludge or only a small amount of sludge. The partition walls, either four tubes or two plates, thus extend further upwards than in the example described above. The gas inlets 18 are positioned in the lower region of the cylinder 6 and will create a flow through the flow channels created by the tubes respectively the plates, as described above. The gas bubbles rising up towards the salt water surface will supply the energy for the particles to adhere to the bubbles. The energy is proportional to the height of the cylinder 6. Thus, the distance that the bubbles will travel from the inlet nozzles 18 to the salt water surface will be dependent for the efficiency of the liquid clarifier. A liquid clarifier adapted for unclear salt water may therefore be designed somewhat higher and with a slightly smaller diameter than a liquid clarifier adapted for unclear fresh water and similar liquids where the active sludge mix is also part of the clarifying process.

The clarified salt water is discharged through the liquid outlet 12 as described above. The liquid reactor creates a very high concentration of gas bubbles which results in a large contact area for the particles. This results in an effective flotation of the particles. The residuals from the floatation, i.e. the protein skimming, will rise upwards in the inner chamber and is discharged trough the residual outlet 30 comprised in a funnel-shaped restriction cover 31. The particles will circulate through the flow channels until they have adhered to air bubbles.

Also for these developments, it is possible to improve the clarification of the unclear salt water by using a further gas injector 25 adapted to inject micro bubbles as described above. The micro bubbles are preferably injected in the upper region 29 of the inner chamber, relatively close to the salt water surface.

In the inventive method for clarifying a liquid, the liquid is inserted to the inner chamber 7 created by the cylinder 6 in the vertical tank 3. The tank 3 comprises an upper, vertical section 4 and a tapered lower section 5. The lower region of the inner chamber is provided with at least one partition wall that extends out of the lower region of the inner chamber and into the lower section 5 of the tank. Compressed gas is injected into the lower region 28 of the inner chamber, between the partition walls, thereby circulating the liquid between the at least one partition wall and the inner wall of the inner chamber, where the at least one partition wall creates a compression zone for the liquid, and where the liquid is decompressed above the at least one partition wall and also below the at least one partition wall, thereby forcing the particles in the liquid to flocculate and to form an active sludge mix that will deposit in the bottom section of the tank. The upper border of the active sludge mix 24 is preferably held at the same height as the upper part of the at least one partition wall, and the active sludge mix region may fluctuate around this height. The clarified liquid is discharged out of the upper part of the tank, outside of the inner chamber, through liquid outlet 12.

The invention is not to be regarded as being limited to the embodiments described above, a number of additional variants and modifications being possible within the scope of the subsequent patent claims.

REFERENCE SIGNS

1: Liquid clarifier
2: Liquid reactor
3: Vertical tank
4: Upper section
5: Lower tapered section
6: Tubular cylinder
7: Inner chamber
8: Apex
9: Outlet
10: Outlet section
11: Upper edge
12: Outlet opening
13: Upper edge
14: Outlet opening
15: Liquid inlet
16: Lower edge
17: Gas source
18: Gas inlet
19: Tube
20: Plate
21: Flow channel
22: Flow channel
23: Grid
24: Active sludge mix
25: Micro bubble injector
26: Partition wall
27: Feedback conduit
28: Lower region
29: Upper region
30: Residual outlet
31: Funnel shaped cover
32: Tube
33: Plate

The invention claimed is:

1. Liquid clarifier for treating a liquid, comprising a liquid reactor which comprises an essentially cylindrical vertical tank having an upper section with substantially vertical walls and a lower tapered section having an outlet for discharging waste, an inner cylinder having a lower region and an upper region that is positioned higher than the lower region, where the inner cylinder extends along at least part of the upper section of the tank and an outlet for clarified liquid at the top of the tank, where the liquid clarifier further comprises a gas source adapted to inject compressed gas into the lower region of the inner cylinder and an inlet for an unclear liquid at the upper region of the inner cylinder, characterized in that the liquid reactor further comprises at least two partition walls inside the lower region of the inner cylinder, where the at least two partition walls create flow channels in the lower region of the inner cylinder, where the compressed gas is adapted to be injected through gas inlets in flow channel/s in order to create an upward liquid flow in the flow channel/s having gas inlets, which will create a downward liquid flow in the flow channel/s without gas inlets so that one downward flow channel is adjacent two upward flow channels via the partition walls, where the at least two partition walls extend out of the lower region of the inner cylinder, and the inner cylinder ends before a bottom of the cylindrical vertical tank.

2. Liquid clarifier according to claim 1, characterized in that the liquid reactor is further provided with an outlet for low density particles at the top of the cylinder.

3. Liquid clarifier according to claim 1, characterized in that the at least two partition walls are formed by two or more cylindrical tubes.

4. Liquid clarifier according to claim 3, characterized in that the two or more cylindrical tubes are mounted in a grid in the inner cylinder, where the opening area of the grid is set to a predefined value.

5. Liquid clarifier according to claim 1, characterized in that the at least two partition walls are formed by two or more plates inside the cylinder.

6. Liquid clarifier according to claim 1, characterized in that the liquid reactor further comprises a second gas injector positioned in the cylinder, which is adapted to inject micro gas bubbles.

7. Liquid clarifier according to claim 1, characterized in that the at least two partition walls are configured to be moveable parallel to the wall of the cylinder so as to be displaced in a vertical direction.

8. Liquid clarifier according to claim 1, characterized in that the at least two partition walls extend into the tapered lower section of the tank.

9. Liquid clarifier according to claim 1, characterized in that the liquid clarifier comprises a feedback conduit that is adapted to forward part of the waste discharged through the outlet in the bottom of the lower section of the tank to the liquid inlet.

10. Liquid clarifier system, comprising a plurality of liquid clarifiers according to claim 1.

11. Method for clarifying a liquid, comprising the steps of:

inserting an unclear liquid at the top of an inner chamber in a vertical cylindrical tank having a tapered lower section, injecting compressed gas into the lower region of the inner chamber, where the inner chamber is provided with at least two partition walls in the lower region of the inner chamber, where the at least two partition walls create flow channels in the lower region of the inner chamber, and where the compressed gas is injected in some flow channels such that an upward flow is created in the flow channels having gas inlets and such that a downward flow is created in the flow channels without gas inlets so that one downward flow channel is adjacent two upward flow channels via the partition walls, and where the at least two partition walls extend out of the lower region of the inner chamber, and the inner chamber ends before a bottom of the cylindrical vertical tank, thereby circulating the liquid through the flow channels, where the at least one partition wall creates a compression zone for the liquid, and where the liquid is decompressed above the at least one partition wall, thereby forcing the particles in the liquid to bond to each other and/or to gas, and discharging clarified liquid out of an upper section of the tank, outside of the inner chamber.

12. Method according to claim 11, comprising the step of controlling the circulation in the inner chamber by a grid mounted in the lower region of the inner chamber, where the grid has a predefined flow throughput.

13. Method according to claim 11, comprising the step of controlling micro gas bubbles into the inner chamber above the at least one partition wall in order to improve the flocculation of particles in the liquid.

14. Method according to claim 11, comprising the step of moving the at least two partition walls in the vertical direction.

* * * * *